(12) United States Patent  
Reynolds et al.

(10) Patent No.: US 7,280,020 B2  
(45) Date of Patent: Oct. 9, 2007

(54) MAGNETIC INERTIAL FORCE GENERATOR

(75) Inventors: Michael G. Reynolds, Troy, MI (US); William C. Goodwin, Brighton, MI (US)

(73) Assignee: General Motors Corporation, Detroit, MI (US)

( * ) Notice: Subject to any disclaimer, the term of this patent is extended or adjusted under 35 U.S.C. 154(b) by 101 days.

(21) Appl. No.: 10/786,842

(22) Filed: Feb. 25, 2004

(65) Prior Publication Data

US 2005/0184842 A1    Aug. 25, 2005

(51) Int. Cl.  
*H01F 7/00* (2006.01)  
*H01F 7/08* (2006.01)

(52) U.S. Cl. ........................ 335/229; 335/224

(58) Field of Classification Search ........ 335/220–234; 251/129.01; 129/90.11  
See application file for complete search history.

(56) References Cited

U.S. PATENT DOCUMENTS 5,434,549 A * 7/1995 Hirabayashi et al. ....... 335/229  
5,896,076 A * 4/1999 van Namen ................. 335/229  
5,947,155 A * 9/1999 Miki et al. ............. 137/625.65  
6,422,533 B1 * 7/2002 Harms ..................... 251/129.1  
6,960,847 B2 * 11/2005 Suzuki et al. ............... 335/229

* cited by examiner

*Primary Examiner*—Elvin Enad  
*Assistant Examiner*—Bernard Rojas

(57) ABSTRACT

A magnetic inertial force generator includes a magnetic shell internally defining an armature chamber. At least two circumferential electric coils are spaced longitudinally within the chamber and mounted on a cylindrical inner surface of the outer shell. An armature centered by springs is reciprocably supported in the chamber and includes at least two axially spaced radially magnetized permanent magnets mounted on a longitudinally extending magnetic steel tube. The magnets extend in general alignment with the coils. Controlled energizing of the coils reciprocates the armature axially relative to the shell to develop an opposite inertia force on the shell for application to a connected body. The use of multiple radially magnetized magnets provides for improved performance and/or reduced cost.

19 Claims, 3 Drawing Sheets

MAGNETIC INERTIAL FORCE GENERATOR

TECHNICAL FIELD

This invention relates to magnetic inertial force generators and, more particularly, to an improved generator capable of higher output and/or manufacturable at lower cost.

BACKGROUND OF THE INVENTION

FIG. 1 illustrates a known form of magnetic inertial force generator 60, including a cylindrical housing 62 defining internally an armature chamber 64 containing an armature 66 reciprocable along a central axis 68. The housing 62 is formed with a cylindrical magnetic steel shell 70 closed by aluminum end caps 71, 72 and containing a pair of axially spaced electric coils 73, 74 mounted on the interior of the housing 62.

The armature 66 includes a permanent magnet 76 having axially spaced north N and south S poles at opposite ends on which a pair of magnetic steel end plates 78 are mounted. The end plates 78 extend laterally to outer ends 80, forming a periphery of the armature 66 in general alignment with the electric coils 73, 74. The permanent magnet 76 generates a magnetic flux field concentrated in the steel end plates 78 and extending radially through the coils 73, 74 into the steel shell 70. Upper and lower resilient springs 82, 84 between the end plates 78 and the end caps 71, 72 of the housing 62 are configured for nominally centering the armature 66 between the end caps within the chamber 64.

In operation, an AC voltage of controllable frequency is applied to the electric coils 73, 74 so that an AC current flows in the coils. The interaction of the magnetic flux from the armature 66 and the current in the coils creates a force on the armature and an equal and opposite force on the coil. Because the coils 73, 74 are rigidly attached to the outer shell 70, no force is transmitted outside the inertial force generator from the coil. As the armature 66 moves upward, the upper spring 82 is compressed and the lower spring 84 is extended. If the armature moves downward, the reverse is true. As the springs 82, 84 are compressed and expanded, the force is transmitted to the end caps 71 and 72. Because the end caps are rigidly attached to the outer shell 70, no force is transmitted outside the inertial force generator from the springs.

As the armature 66 moves up and down, the armature undergoes a time-varying position, velocity, and acceleration. Because the moving armature has mass, a force is required to maintain the position of the inertial force generator 60. Without equal and opposite force, the shell 70, coils 73 and 74, and end caps 82 and 84 would move downward together as the armature 66 moved upward to keep the center of mass of the inertial force generator in the same position. As a result, the inertial force generator 60 is capable of exerting force on a connected body for any desired purpose. Such purposes may include for example, vibration testing of manufactured assemblies, and reduction or cancellation of vibrations by application of forces opposite to the forces stimulating the motion of the vibration.

SUMMARY OF THE INVENTION

The present invention provides an improved magnetic force generator, which is capable of providing increased inertia force in a package of the same size and/or of providing comparable output at a lower cost for manufacture of a force generator.

The force generator is improved by substituting first and second radially magnetized permanent magnets in place of the axially magnetized permanent magnet of the prior art design. The magnets are axially spaced, are mounted on a longitudinally extending magnetic steel tube and are generally aligned with electric coils provided in the inner surface of a surrounding housing. Since the magnets are radially magnetized, the magnetic flux created by the magnets acts directly on the coils, therefore the end plates may be removed from the armature. To further improve the transfer of magnetic flux between the magnets and the coils, as well as the tube, the axial lengths of the coils and the tube are preferably increased to the axial lengths of the magnets to allow the electrical resistance to be maintained or reduced below that achieved in smaller cross section wire coils.

The housing is preferably cylindrical, but could be of any desired cross-sectional configuration. The surrounding housing may be made of magnetic steel as before and provided with aluminum ends and upper and lower springs centering the armature between the end plates. Evaluation indicates that use of multiple radially magnetized permanent magnets in the armature provides a greater magnetic flux link between the magnets and the coils. As a result, an armature having the same length with less magnetic material can provide equivalent or greater output and can be manufactured at a lesser cost due to the reduction of magnetic material.

These and other features and advantages of the invention will be more fully understood from the following description of certain specific embodiments of the invention taken together with the accompanying drawings.

DESCRIPTION OF THE PREFERRED EMBODIMENT

Figure 2:
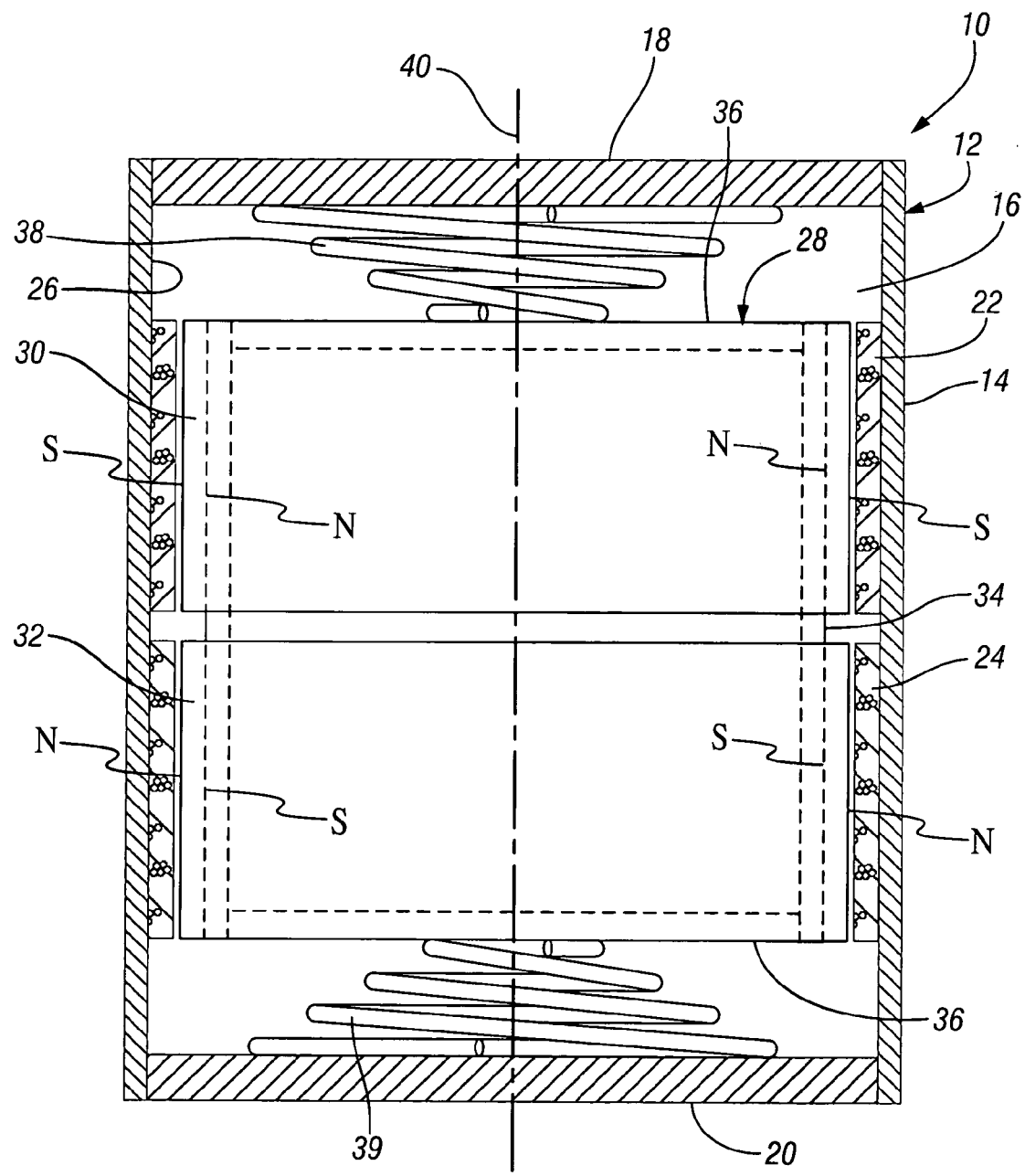
FIG. 2 is a cross-sectional view similar to FIG. 1 but showing an improved magnetic force generator in accordance with the present invention.

Referring now to FIG. 2 of the drawings in detail, numeral 10 generally indicates a magnetic force generator formed in accordance with the invention. Force generator 10 includes a housing 12 having a generally cylindrical outer shell 14 defining an inner cylindrical chamber 16 closed at its ends by nonmagnetic aluminum ends 18, 20. At least two circumferential electric coils 22, 24 are spaced longitudinally within the chamber 16 and mounted on a cylindrical inner surface 26 of the outer shell 14. The coils 22, 24 are wound in opposite directions each comprising a single coil row, although multiple coil rows could be used if desired.

Figure 3:
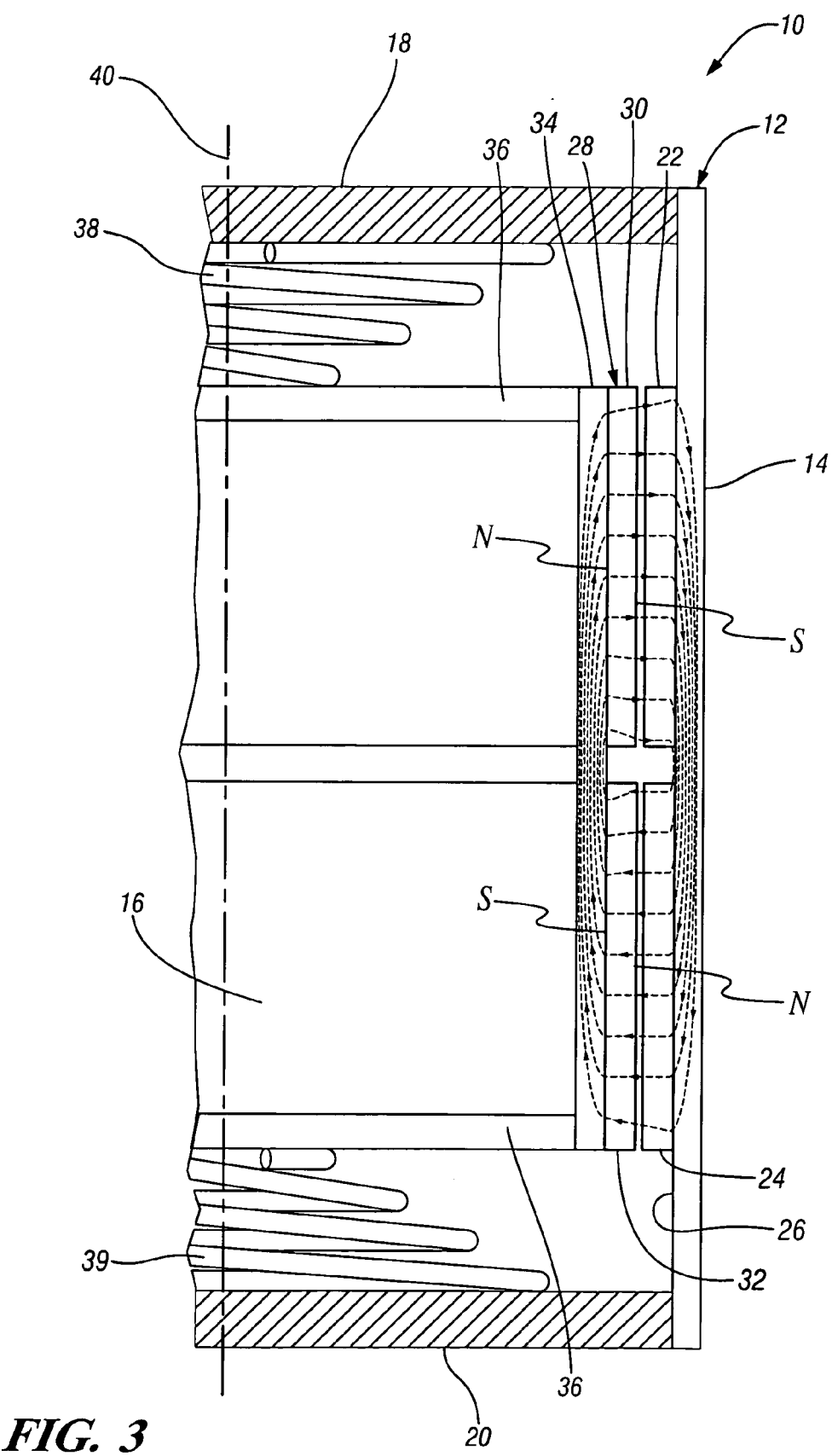
FIG. 3 is a diagrammatic cross-sectional view showing the flux lines of the magnetic force generator of FIG. 2.

Within the chamber 16 an armature 28 is reciprocably supported. Armature 28 includes at least two radially magnetized hollow cylindrical permanent magnets 30, 32 axially spaced and mounted on the exterior of a longitudinally extending core, such as a magnetic steel tube 34. The tube desirably supports and maintains a magnetic flux path through the magnets over approximately their full lengths, as shown in FIG. 3. Preferably, the magnets are formed of a magnetic material such as ferrite or any other suitable magnetic material. The magnets 30, 32 are radially magnetized in opposing directions so that the north N and south S poles of one magnet 30 are at its radially inner and outer surfaces while the N and S poles of the other magnet 32 are respectively at its outer and inner surfaces. Magnets 30, 32 may be ring magnets as shown or may be formed with any desired configuration. The magnetic steel tube 34 is preferred because the cavity inside the tube provides a convenient location to add weight to aid in adjusting the resonant frequency of the actuator. However, the magnetic steel tube 34 may be replaced by a solid core.

At opposite ends of the armature 28, end caps 36 are fixed to the steel tube 34 to provide closures. The end caps 36 engage upper and lower springs 38 and 39 which are fixed to the ends 18, 20 to bias the armature toward the center of the chamber 16. This arrangement allows the armature 28 to move reciprocably against the springs 38 and 39 along the central axis 40 but restrains the armature against lateral motion within the chamber 16. When the armature 28 is centered, the magnets 30, 32 are positioned opposite from and in general radial alignment with the corresponding electric coils 22, 24 mounted within the housing 12. The cross-sectional area (volume) occupied by the stationary coils is significantly larger than that of the force generator of FIG. 1.

Referring now to FIG. 3, the magnets 30, 32 cooperate to develop a continuous magnetic flux field which passes for example, from the interior north pole N of magnet 30 through the steel tube 34 to the interior south pole S of magnet 32 and through to its exterior north pole N passing then through coil 24, outer shell 14 and coil 22 to the exterior south pole S of magnet 30 and through the magnet to its interior north pole N.

In order to provide the desired operation of the force generator, the electric coils 22, 24 are wound in opposite directions and connected to a controllable frequency alternating current (AC) voltage. The increased cross-sectional area of the coils 22, 24 allows for an increased number of coil turns for a higher force constant, or an increased wire size for decreased electrical resistance, or a combination of the two. It should be understood, however, that other ways of winding the coils and connecting the coils to the AC voltage may be utilized if desired. Also, it should be understood that more than two individual permanent magnets may be aligned is series to form the armature 28, in which case the arrangement in the poles of the magnet would be adjusted accordingly.

In operation, an AC voltage of controllable frequency is applied to the electric coils 22, 24 so that an AC current flows in the coils. The interaction of the magnetic flux from the magnets and the current in the coils creates a force on the armature and an equal and opposite force on the coil. Because the coils are rigidly attached to the outer shell 14, no force is transmitted outside the inertial force generator from the coil. As the armature moves upward, the upper spring 38 is compressed and the lower spring 39 is extended. If the armature moves downward, the reverse is true. As the springs are compressed and expanded, the force is transmitted to the end caps 18 and 20. Because the end caps are rigidly attached to the outer shell 14, no force is transmitted outside the inertial force generator from the springs.

As the armature moves up and down, the armature undergoes a time-varying position, velocity, and acceleration. Because the moving armature has mass, a force is required to maintain the position of the inertial force generator 10. Without equal and opposite force, the shell, coils, and end caps would move downward together as the armature moved upward to keep the center of mass of the inertial force generator in the same position.

The arrangement of the coils 22, 24 and the use of dual magnets in the embodiment of FIG. 2 represents only one possible example of improved magnetic force generator in accordance with the invention. The arrangement was developed for comparison of the new device with the prior art device of FIG. 1, where the sizes of the devices are the same.

Figure 1:
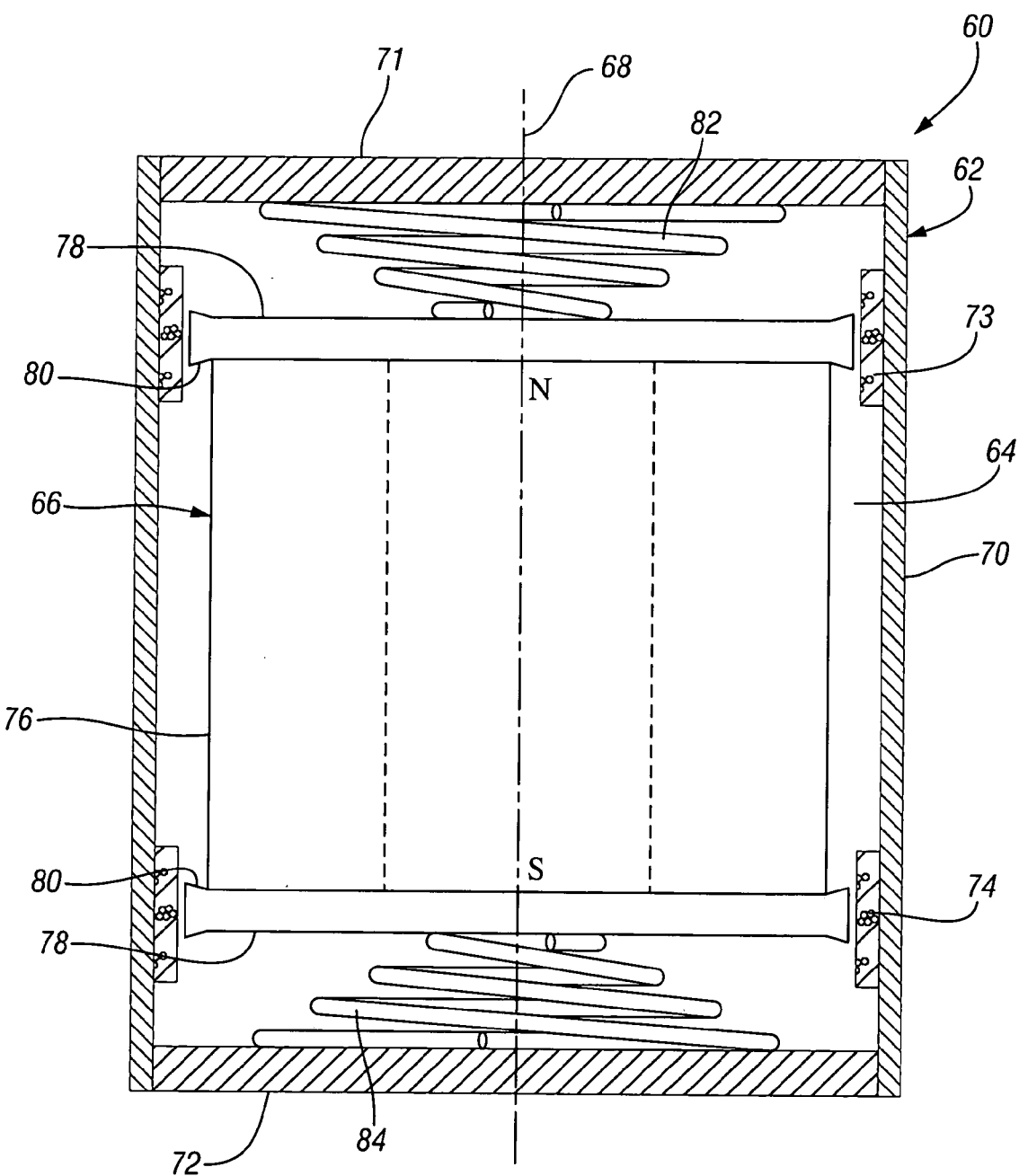
FIG. 1 is a cross-sectional view of a prior art magnetic force generator.

Evaluation of the devices showed that the dual magnet force generator of FIG. 2 has an approximately 40 percent higher force constant (Newtons per Ampere) than the single magnet force generator of the prior art FIG. 1. Also, the dual magnet design of FIG. 2 contains about 75% less magnet material, resulting in a cost reduction.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

The invention claimed is:

1. A magnetic inertial force generator comprising:
   a shell internally defining an armature chamber having an axis;
   at least two circumferential electric coils spaced axially within the chamber;
   an armature supported in the chamber for reciprocation on the axis, the armature including at least two axially spaced permanent magnets mounted on an axially extending exterior of an axially extending magnetic core that supports the magnets over approximately their full axial lengths;
   resilient members nominally centering the armature in the chamber;
   the permanent magnets extending axially, inwardly adjacent and in general alignment with the electric coils;
   the magnets having radially extending flux lines passing through the coils and the magnets and maintaining a continuous flux path between the magnets and the core through the mounting of the magnets on the axially extending exterior of the magnetic core over the approximately full lengths of the magnets; and
   controlled energizing of the coils being operative on the permanent magnets to reciprocate the armature axially in a controlled manner relative to the shell to develop an opposite alternating inertia force on the shell for application to a connected body.

2. A magnetic inertial force generator as in claim 1 wherein the magnets are cylindrical and the core is a steel tube.

3. A magnetic inertial force generator as in claim 2 wherein the resilient members are compression springs.

4. A magnetic inertial force generator as in claim 2 wherein the shell is part of a housing including non-magnetic ends closing the chamber.

5. A magnetic inertial force generator as in claim 2 wherein the shell is formed of material which carries magnetic flux.

6. A magnetic inertial force generator as in claim 5 wherein the shell material is carbon steel.

7. A magnetic inertial force generator as in claim 2 wherein the armature has end caps formed of a non-magnetic material.

8. A magnetic inertial force generator as in claim 2 wherein the magnets are formed of a suitable magnetic material.

9. A magnetic inertial force generator as in claim 8 wherein the magnetic material is ferrite.

10. A magnetic inertial force generator as in claim 2 wherein the magnets are radially magnetized in opposite directions.

11. A magnetic inertial force generator as in claim 2 wherein the coils are wound in opposite directions.

12. A magnetic inertial force generator as in claim 2 wherein the axial length of the coils is generally similar to the axial length of the magnets.

13. A magnetic inertial force generator comprising:
- a shell internally defining an armature chamber having an axis;
- at least two circumferential electric coils spaced axially and fixed within the chamber;
- an armature supported in the chamber for reciprocation on the axis, the armature including at least two axially spaced cylindrical permanent magnets fixedly mounted on an axially extending cylindrical exterior of an axially extending magnetic tube that supports the magnets over approximately their full axial lengths;
- resilient members nominally centering the armature in the chamber;
- the permanent magnets extending axially, inwardly adjacent and in general alignment with the electric coils;
- the magnets being radially magnetized and generating radially extending flux lines passing through the coils and the magnets and maintaining a continuous flux path between the magnets and the tube through the mounting of the magnets on the axially extending cylindrical exterior of the magnetic core over the approximately full lengths of the cylindrical magnets; and
- controlled energizing of the coils being operative on the permanent magnets to reciprocate the armature axially in a controlled manner relative to the shell to develop an opposite alternating inertia force on the shell for application to a connected body.

14. A magnetic inertial force generator as in claim 13 wherein the shell is part of a housing including non-magnetic ends closing the chamber.

15. A magnetic inertial force generator as in claim 13 wherein the shell is formed of material which carries magnetic flux.

16. A magnetic inertial force generator as in claim 13 wherein the armature has end caps formed of a non-magnetic material.

17. A magnetic inertial force generator as in claim 13 wherein the magnets are radially magnetized in opposite directions.

18. A magnetic inertial force generator as in claim 13 wherein the coils are wound in opposite directions.

19. A magnetic inertial force generator as in claim 13 wherein the axial length of the coils is generally similar to the axial length of the magnets.

* * * * *